(12) United States Patent
Yamada et al.

(10) Patent No.: US 8,953,591 B2
(45) Date of Patent: Feb. 10, 2015

(54) PACKET TRANSFERRING NODE

(75) Inventors: Masaki Yamada, Hachioji (JP);
Mitsuru Nagasaka, Kokubunji (JP);
Takayuki Muranaka, Kawasaki (JP);
Yoshihiro Nakao, Yokohama (JP);
Shinichi Akahane, Hachioji (JP)

(73) Assignee: Alaxala Networks Corporation, Kanagawa (JP)

( * ) Notice: Subject to any disclaimer, the term of this patent is extended or adjusted under 35 U.S.C. 154(b) by 12 days.

(21) Appl. No.: 13/570,675

(22) Filed: Aug. 9, 2012

(65) Prior Publication Data

US 2012/0307823 A1 Dec. 6, 2012

Related U.S. Application Data

(63) Continuation of application No. 11/710,396, filed on Feb. 26, 2007, now Pat. No. 8,259,714.

(30) Foreign Application Priority Data

Jul. 6, 2006 (JP) .................................. 2006-186188

(51) Int. Cl.
*H04L 12/28* (2006.01)
*H04L 12/703* (2013.01)
*H04L 12/751* (2013.01)
*H04L 12/721* (2013.01)

(52) U.S. Cl.
CPC ............... *H04L 45/28* (2013.01); *H04L 45/02* (2013.01); *H04L 45/44* (2013.01)
USPC ........................................................ 370/389

(58) Field of Classification Search
None
See application file for complete search history.

(56) References Cited

U.S. PATENT DOCUMENTS

| 6,115,378 A | 9/2000 | Hendel et al. |
| 6,647,014 B1 | 11/2003 | Shimada |

(Continued)

FOREIGN PATENT DOCUMENTS

| JP | 11-331249 | 11/1999 |
| JP | 2001-036272 | 2/2001 |

(Continued)

OTHER PUBLICATIONS

Office Action from Chinese Patent Office dated Sep. 4, 2009, in Chinese.

(Continued)

*Primary Examiner* — Minh-Trang Nguyen
(74) *Attorney, Agent, or Firm* — Mattingly & Malur, PC

(57) ABSTRACT

In a conventional "distributed" integrated network node architecture, specific judgment processes cannot be executed in any routing and transferring unit. The routing and transferring unit is required to share judgment process related information with an enhanced processing unit or other routing and transferring units. Thus, when using enhanced processing units, manufacturing costs increase, while processing speed decreases when routing and transferring units cooperate. If any flow is disposed during a transfer from a packet transferring unit in a routing and transferring unit to a processing unit, the packet is disposed regardless of packet priority. In the present invention, a packet related to a specific judgment process is always transmitted to a specific routing and transferring unit from a line interface unit. If an inputted flow is over the transferring capacity, the line interface unit analyzes the packet header and determines the type, transport priority, and disposal priority of the packet.

10 Claims, 15 Drawing Sheets

(56) References Cited

U.S. PATENT DOCUMENTS

| | | |
|---|---|---|
| 6,870,854 B1 | 3/2005 | Aimoto et al. |
| 2002/0003777 A1 | 1/2002 | Miyamoto |
| 2002/0064128 A1 | 5/2002 | Hughes et al. |
| 2002/0071387 A1 | 6/2002 | Horiguchi et al. |
| 2002/0141339 A1 | 10/2002 | Konuma |
| 2002/0141403 A1 | 10/2002 | Akahane et al. |
| 2003/0128708 A1 | 7/2003 | Inoue et al. |
| 2004/0071142 A1 | 4/2004 | Moriwaki et al. |
| 2004/0158872 A1 | 8/2004 | Kobayashi |
| 2004/0243718 A1 | 12/2004 | Fujiyoshi |
| 2005/0226144 A1 | 10/2005 | Okita |
| 2005/0228851 A1 | 10/2005 | Cornett |
| 2005/0286524 A1 | 12/2005 | Bennett |
| 2006/0190613 A1 | 8/2006 | Cori et al. |
| 2006/0215544 A1 | 9/2006 | Asa et al. |
| 2007/0047472 A1 | 3/2007 | Florit et al. |
| 2007/0071015 A1* | 3/2007 | Wang et al. .................. 370/401 |

FOREIGN PATENT DOCUMENTS

| | | |
|---|---|---|
| JP | 2002-510451 | 4/2002 |
| JP | 2004-120642 | 4/2004 |
| JP | 2004-135106 | 4/2004 |
| JP | 2004-350188 | 12/2004 |

OTHER PUBLICATIONS

Notice of Reason for Rejection from the Japanese Patent Office mailed Nov. 2, 2010, in Japanese.

* cited by examiner

"DISTRIBUTED" INTEGRATED NETWORK NODE

"DISTRIBUTED" INTEGRATED NETWORK NODE INCLUDING AN ENHANCED PACKET PROCESSING UNIT

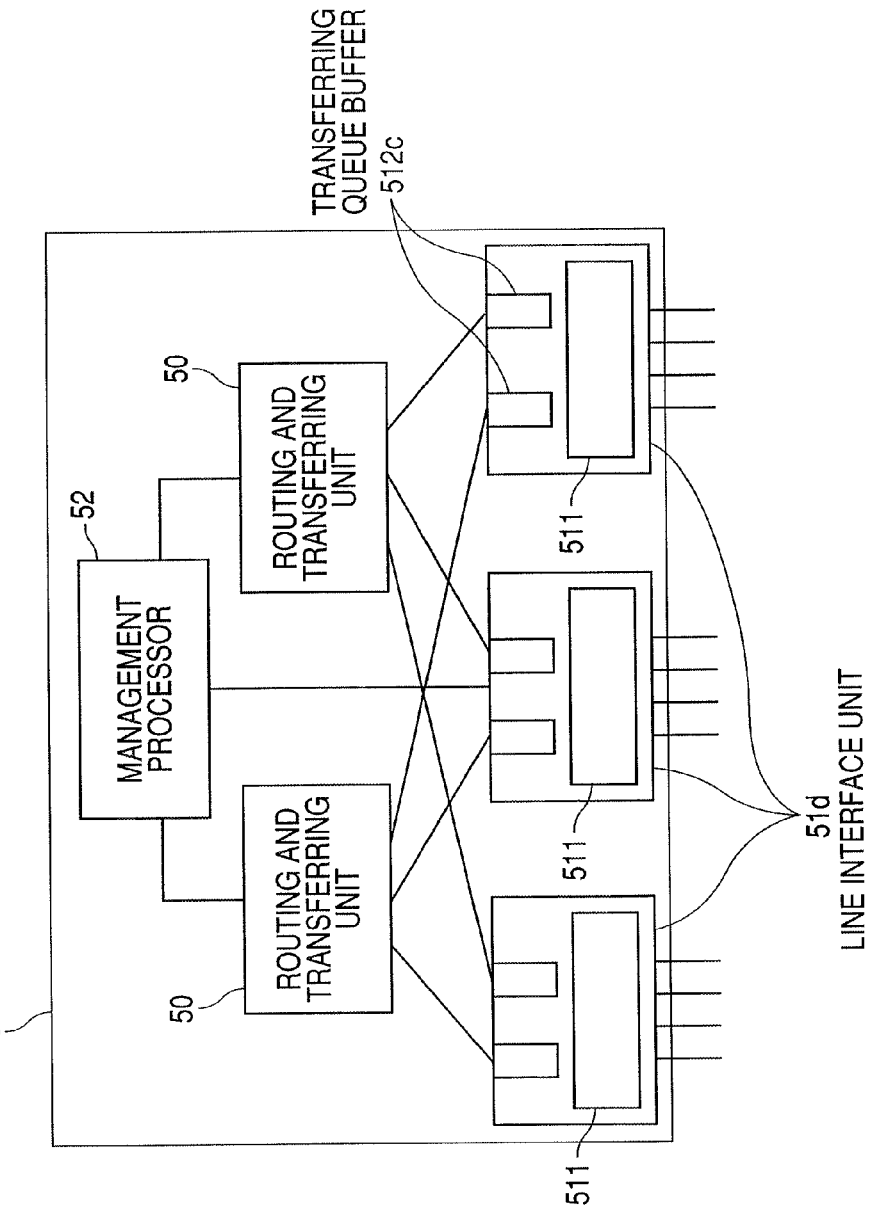

PACKET TRANSFERRING NODE

CLAIM OF PRIORITY

This application is a Continuation of U.S. application Ser. No. 11/710,396 filed on Feb. 26, 2007. Priority is claimed based on U.S. application Ser. No. 11/710,396 filed on Feb. 26, 2007, which claims priority from Japanese application JP 2006-186188 filed on Jul. 6, 2006, the content of which is hereby incorporated by reference into this application.

FIELD OF THE INVENTION

The present invention relates to a packet transferring node for searching of a route of each packet, more particularly to the functions of the packet transferring node.

BACKGROUND OF THE INVENTION

The role of a network node is to relay each packet to its destination in a network. Such network nodes are classified roughly into distributed network nodes, integrated network nodes, and "distributed" integrated network nodes. A node receives a packet through its built-in line and searches its destination from the address set in the packet, then transmits the packet to the destination through a line connected to the destination.

FIG. 1 shows a configuration of a distributed network node. The distributed network node (1) consists of a switching module (10) and plural routing and transferring units (11). Each routing and transferring unit 11 is connected to one or more line interface units (12). The distributed network node (architecture) is characterized so that each routing and transferring unit 11, when the distributed network node 1 receives a packet, can search the route of the packet. This means that such packet route searching operations can be distributed.

FIG. 2 shows a configuration of a routing and transferring unit in a distributed network node (architecture) 11. The routing and transferring unit 11 is connected to a processing unit (110) for searching the transfer destination of each packet, an address buffer (111) for storing the information of the destination, a packet transferring unit (112) for transmitting/receiving each packet to/from each line interface unit 12, and a packet buffer (113) for holding received packets. The routing and transferring unit 11 is connected to the switching module 10 and each of the line interface units 12 through the packet transferring unit 112 so as to transmit/receive packets to/from those units 10 and 12.

In the distributed network node 1, each packet received at a port is transferred from a line interface unit 12 to a routing and transferring unit 11. The routing and transferring unit 11 then searches the route of the packet and transfers the packet to the next routing and transferring unit 11 through the switching module 10. The next routing and transferring unit 11, when receiving the packet through the switching module 10, searches the route of the packet and transfers the packet to another line interface unit 12.

An example of such a distributed network node is disposed in the patent document 1. The distributed network node disposed in the patent document 1 reads and transmits information set in plural layers in each packet.

The patent document 2 discloses an example of another distributed network node. The distributed network node disclosed in the patent document 2 includes plural interface cards connected to each another through a single bus and a computing device provided for each of the interface cards. In the distributed network node disclosed in the patent document 2, each interface card searches the route of each received packet. Thus transferring of packets is realized only by an interface controlling means and a transfer controlling means that are both included in the interface card, thereby the load of the CPU that manages the whole network node is reduced.

The distributed network node is characterized so that the more the routing processing is dispersed with use of many routing and transferring units, the more the packet transferring capacity of the network node is improved. This is why the processing speed of the distributed network node can be improved easily by increasing the number of routing and transferring units. FIG. 3 shows a configuration of an integrated network node. This integrated network node (2) includes a single routing and transferring unit 20. The routing and transferring unit 20 is connected to plural line interface units (21). FIG. 4 shows a configuration of a routing and transferring unit 20 of an integrated network node. The routing and transferring unit 20 of the integrated network node includes a processing unit (200), an address buffer (201), a packet transferring unit (202), and a packet buffer (203). The routing and transferring unit 20 is connected to all of the line interface units 21. The routing and transferring unit 20 searches the route of each packet received from the line interface unit 21, then transmits the packet to another line interface unit 21 according to the result of searching. The line interface unit 21, when receiving the packet, transmits the packet through a port according to a command of the routing and transferring unit 20.

An example of such an integrated network node is disclosed in the patent document 3. The patent document 3 also describes some measures for cooling down the integrated network node.

When compared with the distributed network node described above, the integrated network node is not required to connect plural the routing and transferring units to each another with use of a switch, since the integrated network node has only a single searching and transferring unit. Thus the integrated network node can be simple in structure and reduced in size.

Apart from those two types of network nodes described above, there is still another type of network nodes; it is a "distributed" integrated network node. FIG. 5 shows a configuration of the "distributed integrated network node. The "distributed" integrated network node (3) includes plural routing and transferring unit (30) and plural line interface units (31). Each of the routing and transferring unit 30 is connected to one of the line interface units 31 at a one-to-one correspondence. In other words, in the example shown in FIG. 5, each routing and transferring unit 30 is connected to all the line interface units 31 while the routing and transferring units, as well as the line interface units are not connected to each another.

Just like the distributed network node, the "distributed" integrated network node includes plural routing and transferring units. And just like the integrated network node, the "distributed" integrated network node enables each of the routing and transferring units to be connected to each of the line interface units. Because of such a configuration, the "distributed" integrated network node can improve the routing performance with use of the plurality of routing and transferring units and use the processing capacity more effectively by making good use of the connection of each of the routing and transferring units to all the line interface units. When compared with the integrated network node described above, the "distributed" integrated network node can realize high expandability by enabling addition and modification of the routing and transferring units.

There is another example of the "distributed" integrated network node (architecture), which uses a method disposed in the patent document 4. The patent document 4 describes such a "distributed" integrated network node provided with an enhanced processing unit characteristically. FIG. 6 shows a configuration of the network node disclosed in the patent document 4. The "distributed" integrated network node (4) provided with an enhanced packet processing unit includes an enhanced packet processing unit (40), plural routing managers (41) used for routing, and plural line interface units (42) for housing input/output ports that are all connected to each another through a crossbar switch (43). The routing manager 41 has functions for searching the destination interface information of each packet according to the header information set in the packet received from a given line interface unit 42 and transmitting the packet to the line interface unit described in the destination interface information. Furthermore, the line interface unit 42 also has a function for dispersing the load of the routing manager 41. Such a function for dispersing the routing manager's load includes a dividing function that uses a value obtained from a HASH function that assumes a destination IP address in each packet as an input, a circulating selection dividing function added with an order reversing preventive function, and a load dispersing function based on load observation added with an order reversing preventive function.

The network node disclosed in the patent document 4 includes an enhanced packet processing unit 40 and uses different units for different two processings, that is, enhanced packet processing and routing. Consequently, the processing speed of the network node can be much improved when compared with a case in which communications are made between the routing and transferring units.

SUMMARY OF THE INVENTION

In the case of the distributed network node, if packet routing is concentrated at a specific routing and transferring unit, the routing capacity can be reduced even when no congestion occurs in any other routing and transferring units. Thus packet missing might occur even when congestion occurs in a single routing and transferring unit. This is why each routing and transferring unit is required to have a capacity enough to cope with the maximum capacity of each line interface unit. As a result, the manufacturing cost increases and the network node itself is expanded in size. This has been a problem.

In the case of the integrated network node, because the node includes only a single routing and transferring unit, it is difficult to expect improvement of the performance of the network node even by increasing the number of the routing and transferring units. Furthermore, because the network node is configured not to expect replacement of the routing and transferring unit, the expandability of the network node is low. These have also been problems.

BRIEF DESCRIPTION OF THE DRAWINGS

FIG. 18 is a schematic diagram of a transferring queue buffer corresponding to specific packet judgment, as well as both disposal priority and transport priority.

Figure 1:
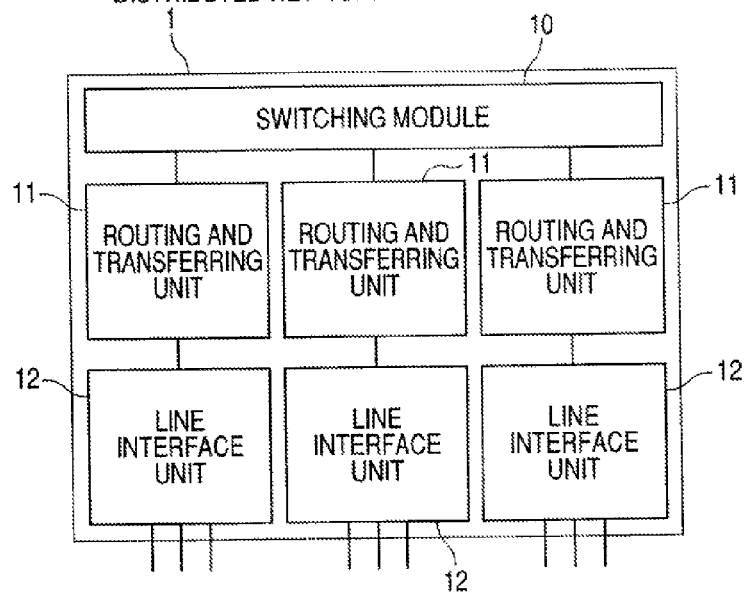
FIG. 1 is a schematic diagram of a distributed network node.
Figure 2:
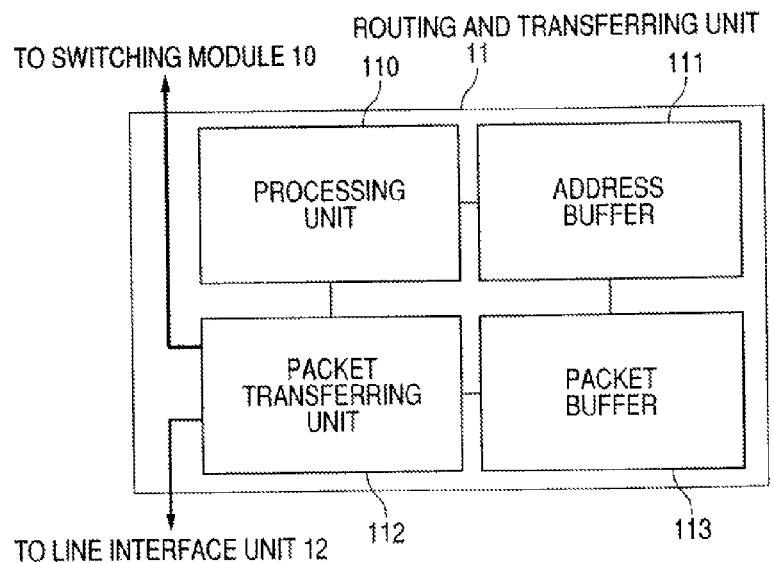
FIG. 2 is a block diagram of a routing and transferring unit of a distributed network node.
Figure 3:
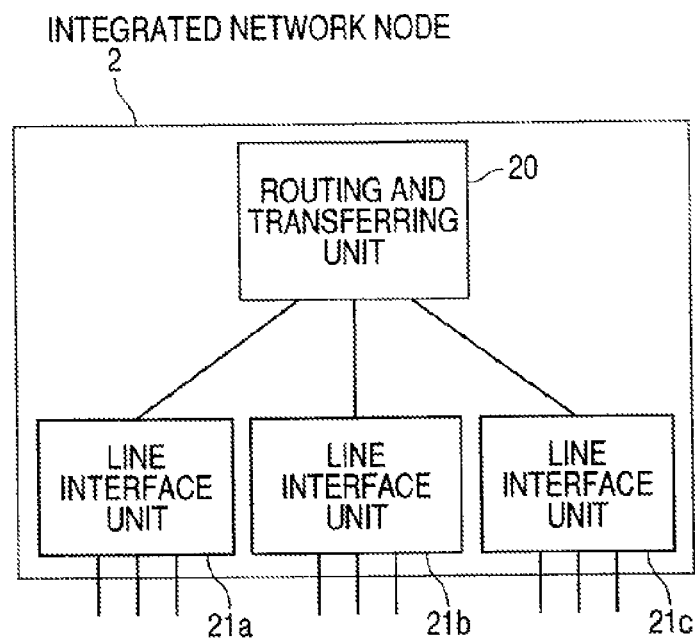
FIG. 3 is a schematic block diagram of an integrated network node.
Figure 4:
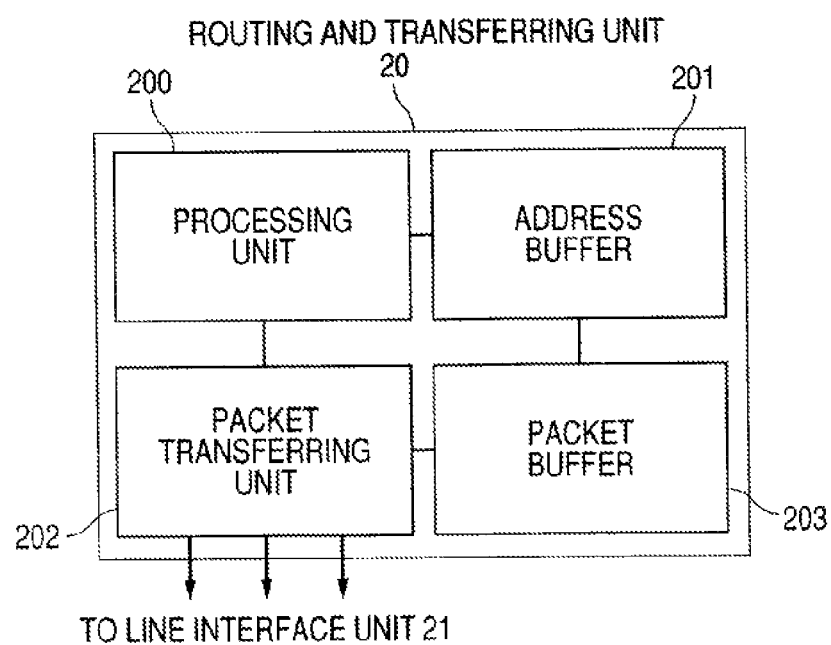
FIG. 4 is a schematic block diagram of a routing and transferring unit of an integrated network node.
Figure 5:
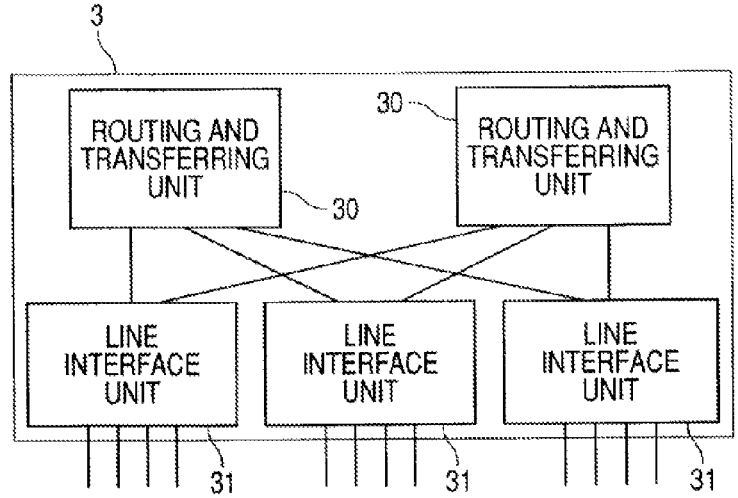
FIG. 5 is a schematic block diagram of a "distributed" integrated network node provided with an enhanced packet processing unit.
Figure 6:
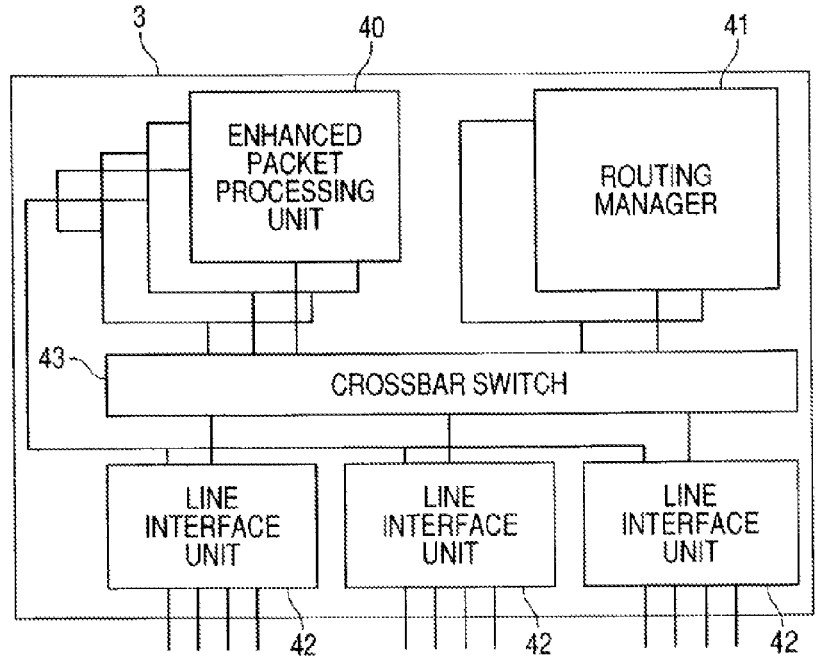
FIG. 6 is a schematic block diagram of a "distributed" integrated network node.

Furthermore, in the case of the distributed network node, communications between routing and transferring units have been required to realize processings for specific control packets with use of a timer in each routing and transferring unit. Thus this method comes to suffer a problem that it is difficult to improve the processing speed of those specific control packets.

In the case of the "distributed" integrated network node in which each of plural routing and transferring units operates independently, any of the routing and transferring units cannot execute specific judging processes during control packet processings that require monitoring of timings. And to realize those specific judging processes, it is required to provide another enhanced processing unit or share a control timer in the cooperation between routing and transferring units. However, the manufacturing cost rises when such an enhanced processing unit is used and the control protocol for high-speed communications cannot be realized and the expandability of the network node is lowered when cooperation is taken between routing and transferring units. These have also been problems.

And in the case of a conventional "distributed" integrated network node, if a flow of packets is inputted over the capacity of transferring from a line interface unit to a routing and transferring unit, some packets are disposed during the transferring from a packet transferring unit provided in a routing and transferring unit and the processing unit. In this case, because the conventional network node is not provided with any means for checking the priority of each inputted packet, some packets come to be disposed regardless of the packet priority. This has also been a problem.

In order to solve the above problem, the present invention has made a rule so that each packet related to a specific judging process is always transmitted to a specific routing and transferring unit from a line interface unit. In case where enhanced judging processes are concentrated in a single routing and transferring unit, the load is also concentrated in the routing and transferring unit. Therefore, the present invention disperses the load by changing the destination routing and transferring unit for each type of judging process even when the judging process is a specific one.

And the line interface unit of the network node of the present invention includes a mechanism for judging the priority of each packet before transferring the packet to the routing and transferring unit. The priority is divided into disposal priority and transport priority. Those two types of priority are used for transferring packets from each line interface unit to each routing and transferring unit.

The network unit of the present invention enables such specific judging processes as control packet processings that require monitoring of timing without any enhanced processing unit and without communications between routing and transferring units, although such control packet processings have required use of an enhanced processing unit or communications between routing and transferring units in the conventional "distributed" integrated network node. Consequently, the network node of the present invention can be reduced in both manufacturing cost and size more than the conventional network node that uses an enhanced processing unit. And the network node of the present invention can also be improved more in processing speed than a case in which communications are required between routing and transferring units.

Furthermore, the network node of the present invention never lose packets with high transport priority even when the capacity of transferring from a line interface unit to a routing is exceeded during the transfer while it has been a problem in the case of the conventional "distributed" integrated network node.

DETAILED DESCRIPTION OF THE PREFERRED EMBODIMENTS

Hereunder, the preferred embodiments of the present invention will be described with reference to the accompanying drawings.

First Embodiment

Figure 7:
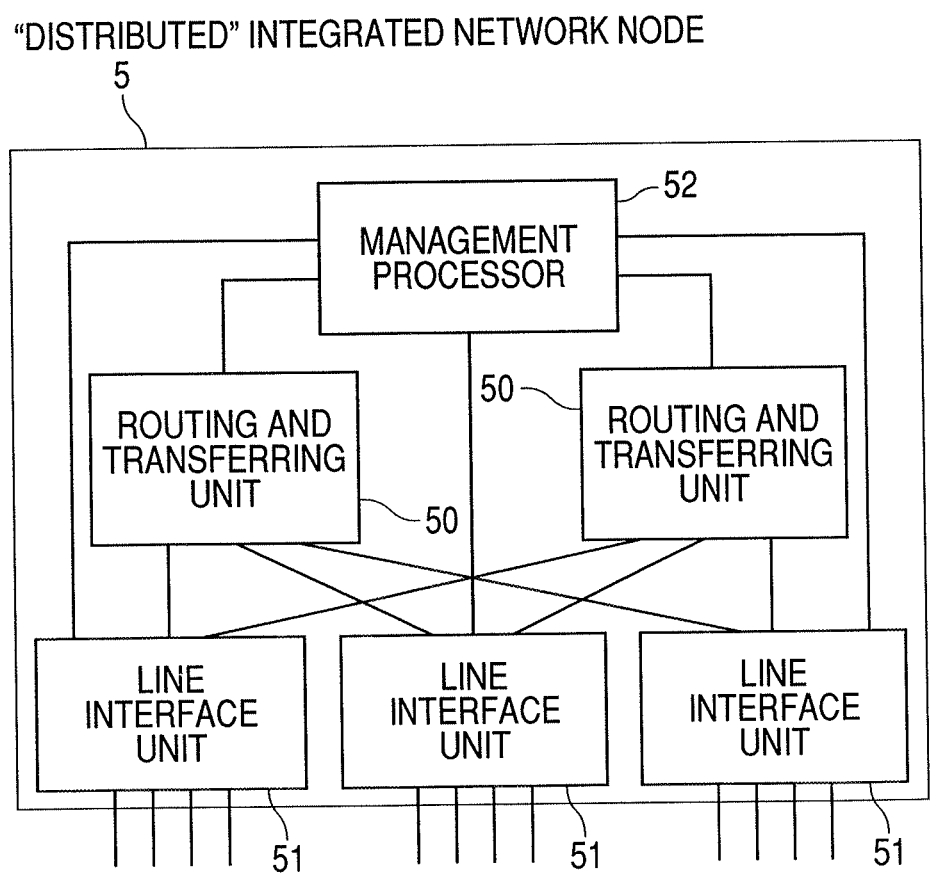
FIG. 7 is a schematic block diagram of a "distributed" integrated network node of the present invention.

FIG. 7 shows a configuration of a network node in a first embodiment of the present invention. The network node in this first embodiment includes plural routing and transferring units (50), plural line interface units (51), and a management processor (52). And each routing and transferring unit 50 is connected to all the line interface units 51. In this configuration of the network node, the number of the routing and transferring units, as well as the number of line interface units can be increased/decreased. The configuration of this network node, when it is provided only with a single routing and transferring unit, is equal to that of the integrated network node and the routing and transferring unit of the "distributed" integrated network node may be employed as the routing and transferring node in this configuration.

Figure 8:
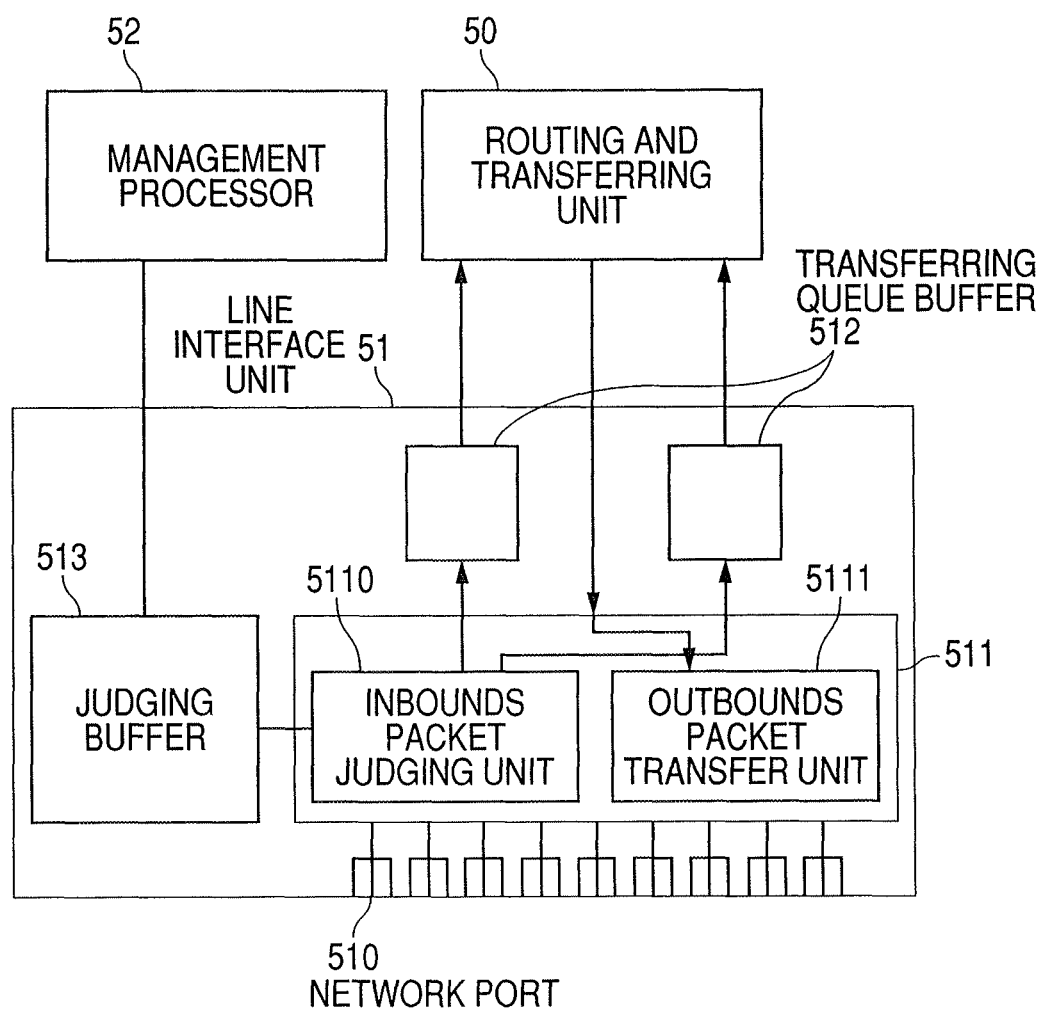
FIG. 8 is a schematic block diagram of a line interface unit of a "distributed" integrated network node of the present invention.

FIG. 8 shows the details of the line interface unit in this network node configuration. The line interface unit (51) includes plural network ports (510) for connecting a network respectively, a packet transmission/receiving unit (511) for identifying each packet inputted from each port and selecting a destination routing and transferring unit for the packet, a transferring queue buffer (512) for temporarily holding data flows to be transmitted to routing and transferring units, and a judging buffer (513) for storing settings of a data flow judging method.

Each network port 510, when receiving a packet through a line of a network, transmits the packet to the packet transmission/receiving unit 510. At this time, the network can use various lines such as copper cables, optical fibers, etc. in its physical layer and each network port has an interface corresponding to any of those physical layers, processes packets in those physical layers, and transfers packets in a data link layer format to the packet transmission/receiving unit 511. Consequently, processings in those physical layers can be ignored in any part of the network node except for the subject network port.

The packet transmission/receiving unit 511 consists of an inbound packet judging unit 5110 for judging each inbound packet and an outbound packet transfer unit 5111 for transferring each outbound packet to a proper network port.

The inbound packet judging unit 5110 executes judgment in two steps to transfer each received packet to a routing and transferring unit. In the first step judgment for an inbound packet, it is judged whether or not the received packet should be processed by a specific routing and transferring unit. In this judgment, the inbound packet judging unit 5110 makes pattern matching with a packet format of the judging buffer 503 to judge whether or not the packet should be processed by any specific routing and transferring unit. If the judging result is YES (should be processed), the inbound packet judging unit transmits the packet to a specific routing and transferring unit according to the setting in the judging buffer 513.

Figure 9:
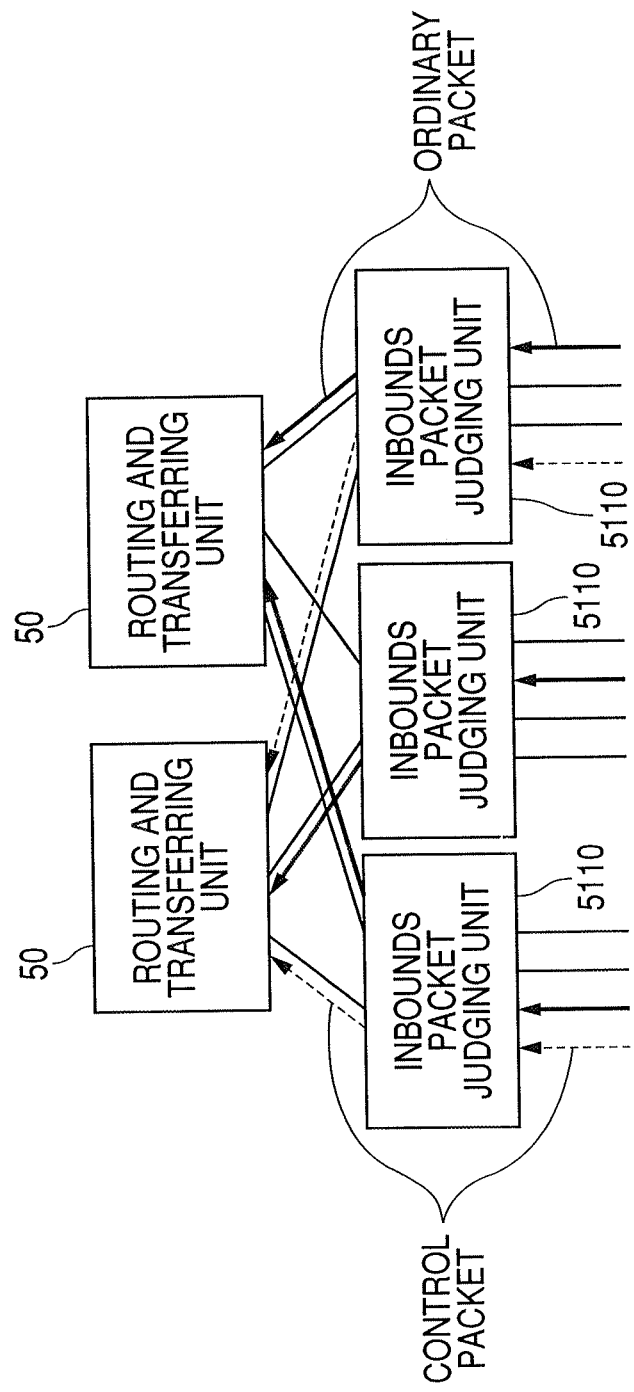
FIG. 9 is a schematic diagram for describing how a control packet is transferred in a "distributed" integrated network node of the present invention.

As an example of the packets that should be processed by a specific routing and transferring unit such way, there are some of control packets. Such control packets are used for controlling a network node in each routing and transferring unit, transmission of reply packets in response to those control packets, etc. FIG. 9 shows such an example. In this example, how a control packet is transmitted to a single routing and transferring unit is shown. However, note that every control packet is not transmitted to a single destination such way. According to the type of the subject control packet, a single routing and transferring unit is selected.

Thus each control packet can be transmitted to and processed in a specific routing and transferring unit, thereby the packet is processed quickly. In addition, if a trouble occurs in a routing and transferring unit, it is replaced with another normal routing and transferring unit for processing the packet. The network node of the present invention can realize such a redundant configuration.

Figure 10:
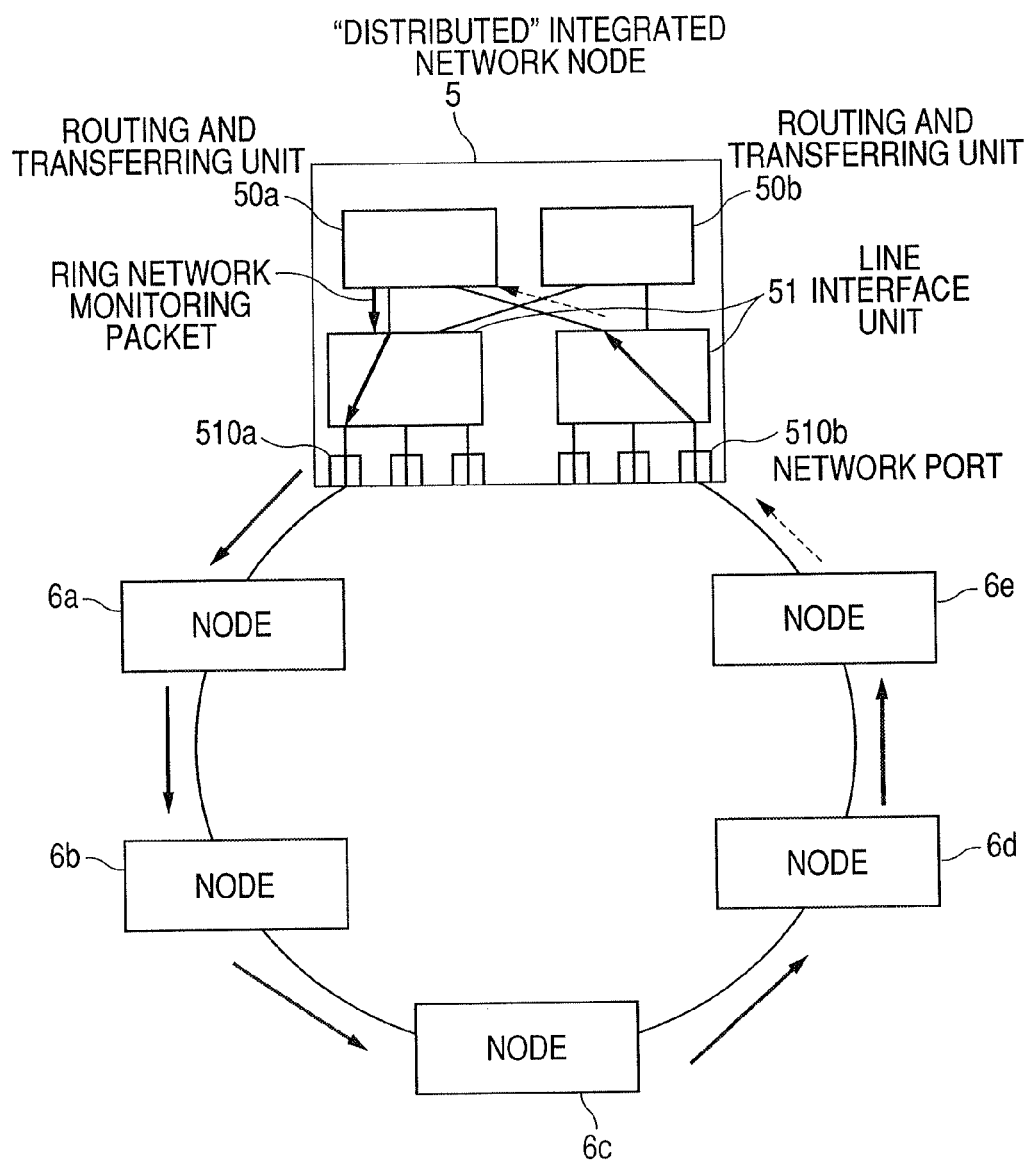
FIG. 10 is a schematic diagram for describing how a ring network protocol is used in a "distributed" integrated network node of the present invention.

As an example of the control packets as described above, there are control packets related to a ring network protocol. FIG. 10 shows a configuration of a ring network topology of the network node in this embodiment. The ring network protocol is used to transmit/receive packets for monitoring ring disconnection to normally operate the ring network topology of the network node in this embodiment. The routing and transferring unit 50a of the network node in this embodiment creates a ring network monitoring packet and transmits the packet to the ring network through a network port 510a of a line interface unit. The routing and transferring unit includes a timer for monitoring the ring network. Each node of the ring network relays the network monitoring packets in the ring network. Each network monitoring packet relayed through the ring network is received by a network port 510b and judged by a line interface unit about whether or not it is a ring network protocol one, then transmitted to the routing and transferring unit 50*a*.

The routing and transferring unit, when receiving a monitoring packet, updates the timer that monitors the ring network. The monitoring packet is transmitted every fixed time. If the timer is not updated for a certain time, the routing and transferring unit judges it as ring network disconnection and unblocks a blocked network port. Then, the routing and transferring unit reports a trouble occurred in the ring network to the management processor and transmits a trouble occurrence notification packet to each node of the ring network according to the ring network protocol. The routing and transferring unit keeps transmission of ring network monitoring packets through a network port to confirm the line recovery even while it is judged as ring network disconnection. Consequently, line disconnection and line recovery can be detected quickly. Furthermore, unlike the distributed network node described above, ring network disconnection is detected in the single routing and transferring unit and the monitoring by the timer is taken over in another routing and transferring unit even when a timer trouble occurs in a routing and transferring unit, thereby detecting of such ring network disconnection can be continued to improve the reliability of the detection of ring network disconnection.

In the second judgment, the inbound packet judgment unit judges the routing and transferring unit that transmits the packet that is not judged as a packet to be transmitted to a specific routing and transferring unit in the first judgment. There are three methods applicable for this judgment of the destination routing and transferring unit. The first method determines a destination routing and transferring unit uniquely according to a port to which a subject packet is inputted. The second method identifies such common parameters as transmission and receiving MAC addresses, transmission and receiving IP addresses, transmission and receiving port numbers, etc. in the same flow obtained from the header information of the packet in the layers above the L2, then applies a HASH function to a target area, thereby selecting a target routing and transferring unit according to the obtained HASH value. The third method selects a target routing and transferring unit according to a port with respect to each packet inputted from a specific port and applies a HASH function to each packet inputted from any of other ports than the specific one. Which of the three methods is to be used is determined on the basis of the information stored in the judging buffer.

Figure 11:
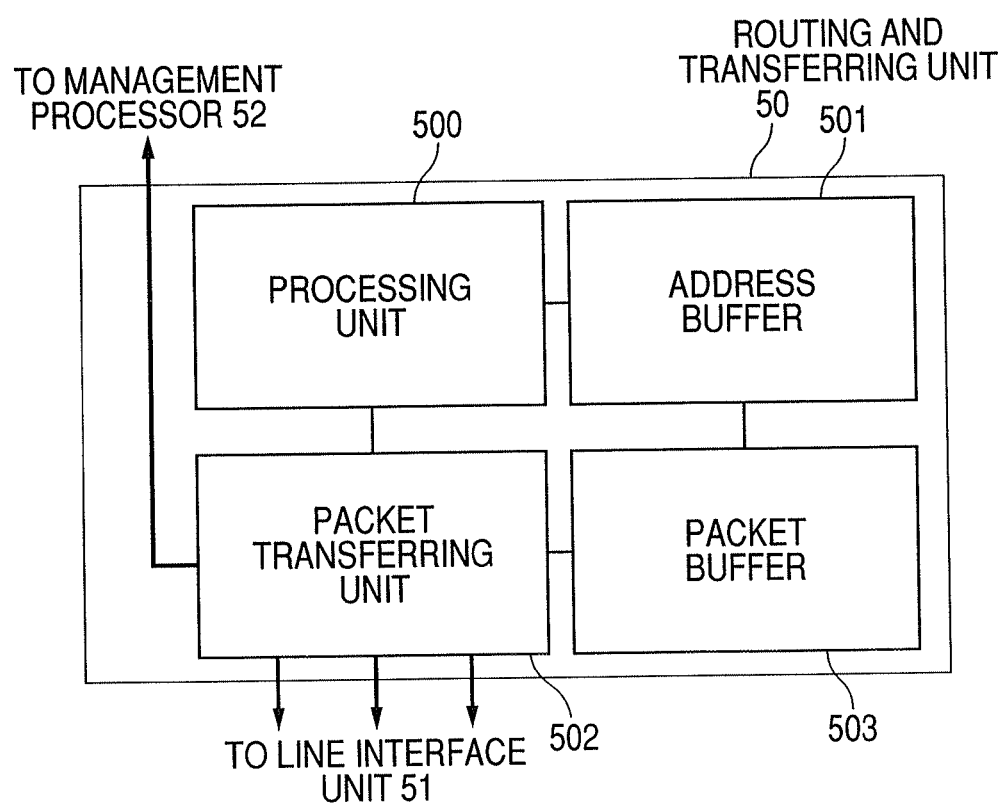
FIG. 11 is a schematic block diagram of a routing and transferring unit of a "distributed" integrated network node of the present invention.

Next, the operation of the routing and transferring unit 50 will be described with reference to FIG. 11. The routing and transferring unit 50, which receives packets from the line interface unit 51 and the management processor 52 further includes means for transmitting each packet to the packet buffer 503 and means for transmitting the header part in the layers above the L2 of the packet to the processing unit 500 provided in the packet transferring unit 502, as well as an address buffer 501 for holding address information. The packet buffer accumulates received flows and waits for a call command from the packet transferring unit 502.

The processing unit 500, when receiving the header information, searches two items related to solving of the packet destination and other processings.

In order to search the destination, the processing unit determines which of the L2 layer and the L3 layer is to be used to transfer the inputted packet. In this case, any of the following two methods may be employed; one of the methods always transfers packets in either the L2 or L3 layer according to the preset data and the other method transfers packets in both L2 and L3 layers according to the L2 layer header information. The processing unit searches the packet destination information in the address buffer 501 according to the judgment result. As a result of searching in case where such an L3 address as an IP address is used for transferring, the processing unit obtains a port for transmitting a subject packet, information of a line interface unit to which the port belongs, and a destination L2 address. According to those information items, the processing unit updates the L2 header information and notifies the packet transferring unit of the updated L2 header information together with the output port information. As a result of searching in case where such an L2 address as a MAC address, the processing unit obtains a port for transmitting a subject packet and information of a line interface unit to which the port belongs. The processing unit notifies the packet transferring unit of this output port information.

Besides the above processings, some packets are transmitted to the management processor and other packets are processed with enhanced functions in the routing and transferring units. The information of those processings is all transmitted to the packet transferring unit. Packets transmitted to the management processor in that case are those of which destinations are unknown, as well as control packets that must be processed in the management processor.

Other processings executed in the processing unit include packet filtering, packet rewriting, judgment of transport priority, mirroring, judgment of the necessity to obtain statistical information, etc., as well as judgment related to the processings with enhanced functions other than the transfer function of the network node. Those processing results are transmitted together with the destination information to the packet transferring unit.

Receiving information related to the packet destination and processings with enhanced functions from the processing unit, the packet transferring unit reads each packet from the packet buffer and processes the packet according to those information items, then accumulates the packet and the information obtained in the processing unit in the transferring queue buffer corresponding to the line interface unit or management processor. At this time, if the processing unit has determined transport priority information, where the packet is to be stored in the transferring queue buffer is changed according to the priority information.

Besides instructing rewriting of information stored in the judging buffer of a line interface unit and in the address buffer of a routing and transferring unit, the management processor can also process packets received from each routing and transferring unit. The packets received form a routing and transferring unit in that case are control packets and those of which destinations are unknown. The management processor can transmit packets to a routing and transferring unit to process those packets. Consequently, the management processor can transmit control packets and learn destinations.

Receiving a packet and the packet output port information from a routing and transferring unit, the line interface unit transfers the packet to the destination port through the outbound packet transfer unit according to those information items. And when the packet is transferred to the destination from the network port, the network node processing is ended.

According to this method, the configuration of the "distributed" integrated network node can be modified flexibly while the configuration expandability is maintained. Furthermore, because only packets that must be processed with enhanced functions are transmitted to a specific routing and transferring unit while the load of the routing and transferring unit is dispersed, the processings are enabled in the routing and transferring unit. The manufacturing cost is thus reduced due to the omission of the processing unit provided with enhanced functions and the speed of the processings of the whole network node can be improved due to the processings realized in the routing and transferring unit.

Second Embodiment

Next, the second embodiment of the present invention will be described. FIG. 7 shows a basic configuration of a "distributed" integrated network node in this second embodiment.

The network node in this second embodiment is a "distributed" integrated network node. This network node can increase/decrease the number of line interface units and the number of routing and transferring units respectively. When compared with the searching and transferring capacity of each of the routing and transferring units, therefore, it is expected that the number of inputs through ports of the line interface units can be much more. The network node in this embodiment can transfer packets most effectively even in such a case.

In this embodiment, the network node includes the routing and transferring unit employed in the first embodiment, a management processor, and a network port and an outbound packet transfer unit that are included in a line interface unit, as well as an input packet judging unit and a transfer queue buffer that are included in the line interface unit to be described below. The inbound packet judging unit in this configuration includes a judging function of the destination routing and transferring unit and makes judgment according to the information of an input port, as well as L2 and L3 transmission and receiving address values set in the header information of each inbound packet and the input/output port number just like in the first embodiment.

Figure 12:
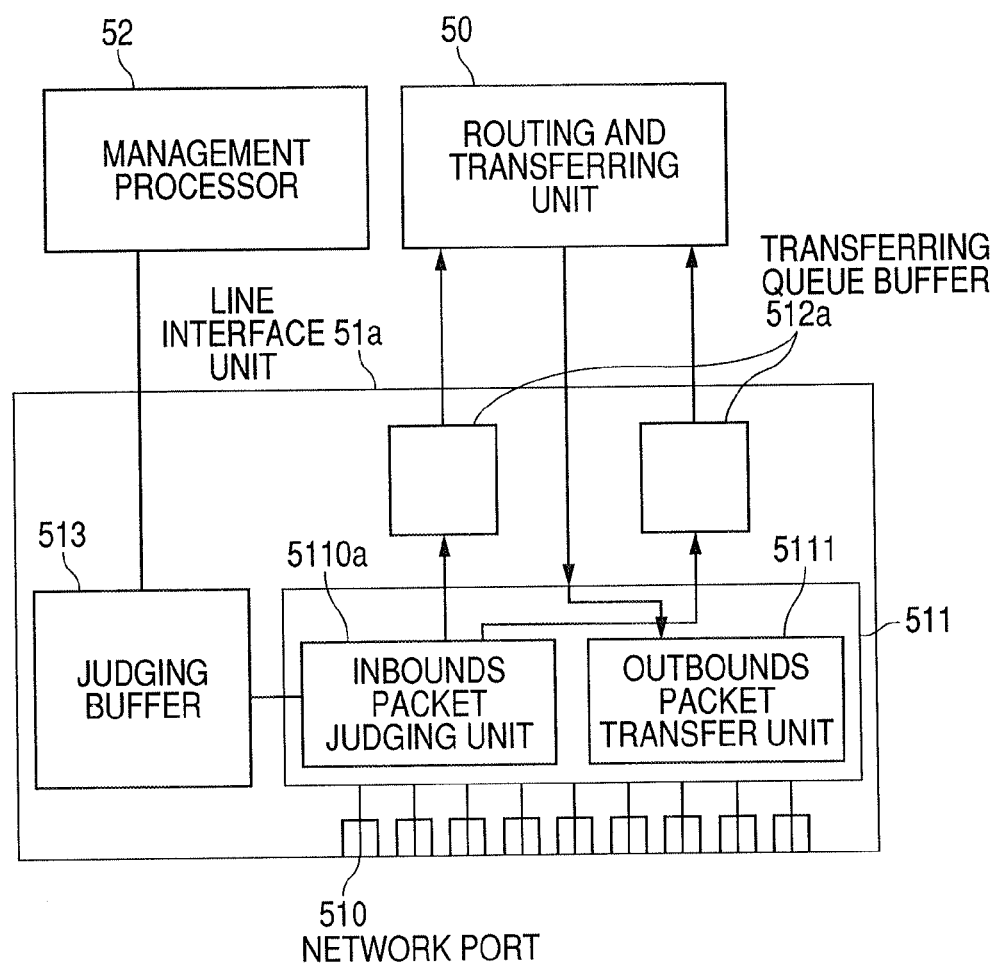
FIG. 12 is a schematic block diagram of a line interface unit having a function for adding disposal priority.

FIG. 12 shows a schematic diagram of a line interface unit. A line interface unit 511a, when receiving a packet from a network port 510, judges the disposal priority of the packet with use of an inbound packet judging unit 5110a. The judgment is done on the basis of a preset policy. Generally, packets are classified according to the QoS information and address of each packet into important packets and control packets to be transmitted with priority, and other less important packets that can be disposed if necessary. According to such a judgment result, the inbound packet judging unit 5110a judges the disposal priority parameter set in each packet. Plural values may be set for the disposal priority. However, depending on the network node, an upper limit value is set for the priority. And because the transferring capacity is affected by plural set priority values, the disposal priority parameter is represented by one bit. If 0 is set for the disposal priority in this embodiment, the subject packet cannot be disposed. When 1 is set for the disposal priority, the packet can be disposed. Each packet, when its disposal priority is judged, is transmitted to the transfer queue buffer 512a together with the disposal priority.

Figure 13:
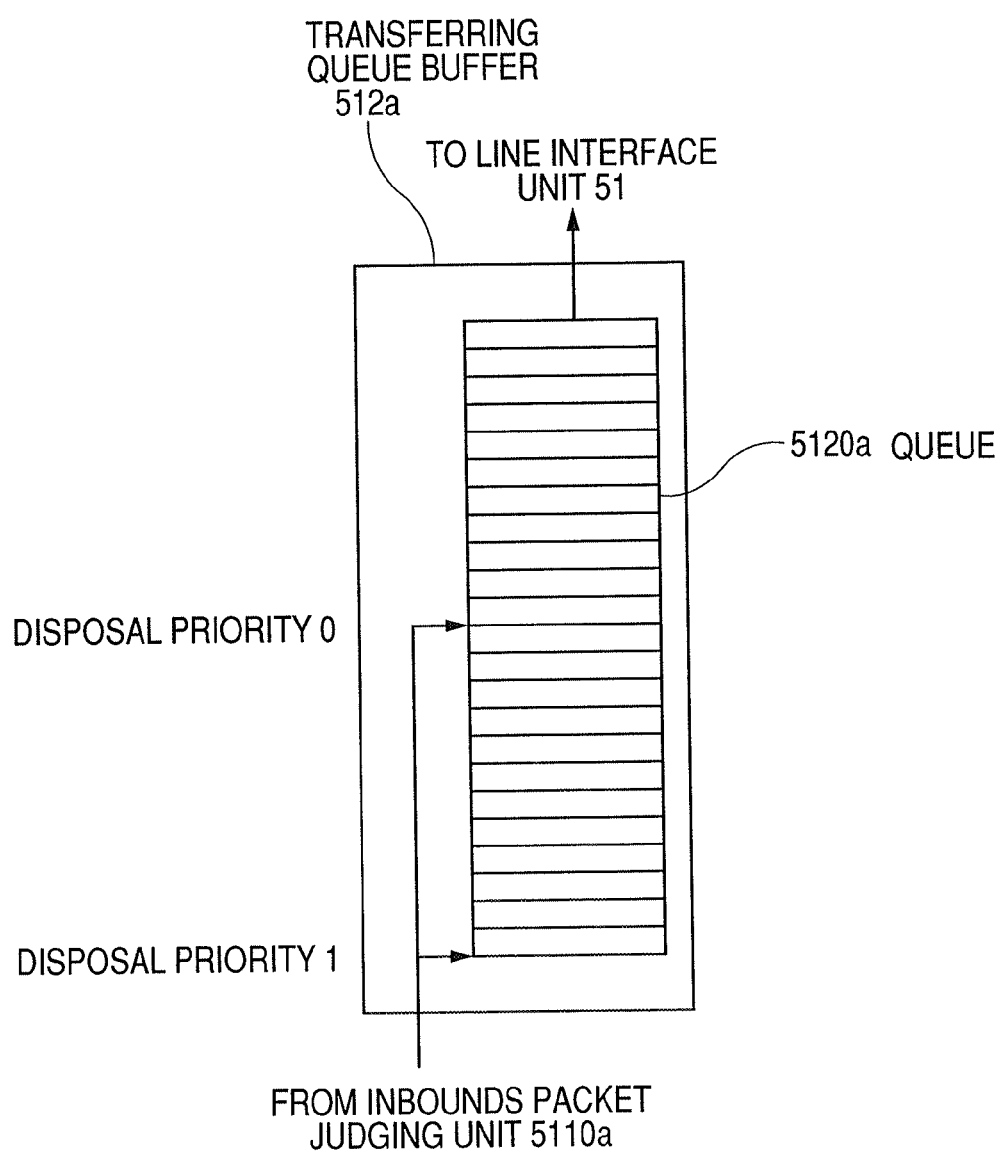
FIG. 13 is a schematic diagram of a transferring queue buffer corresponding to disposal priority.

FIG. 13 shows a configuration of a transferring queue buffer. Packets stored in the transferring queue buffer are transmitted to routing and transferring units sequentially on the basis of the first-in first-out method. In a transferring operation, all the packets stored in a transferring queue buffer are moved into the next buffer sequentially. In case where the number of packets received from the inbound packet judging unit is over the capacity of transferring to the subject routing and transferring unit or the capacity of packet processing in the subject routing and transferring unit, the number of packets stored in the transferring queue buffer increases. As a result, if the transferring queue buffer becomes full, some packets come to be disposed. In such a case, the packet stored in the farthest backward comes to be disposed.

Each packet received from the inbound packet judging unit is stored in the transferring queue buffer according to the disposal priority value. The position of each packet stored in the transferring queue buffer is changed according to the disposal priority. In other words, the higher the packet disposal priority is, the farther the packet is stored in the backward. The lower the priority is, the more the packet is stored in the forward.

Next, another concrete example will be described. In this example, for each received packet having the disposal priority value 0, its position is searched in the transferring queue buffer and stored in a buffer just under those of the packets already stored and having the disposal priority 0 respectively. Each packet received after that and having the disposal priority value 1 is stored in the immediately preceding buffer. Each packet having the disposal priority value 1 comes to be stored in a buffer just under those of all the packets already stored in the transferring queue buffer. Consequently, if a packet having the disposal priority value 1 comes in the transferring queue buffer when the transferring queue buffer is full, the packet is disposed as is. On the other hand, if a packet having the disposal priority value 0 comes in the transferring queue buffer in such a case, a packet already stored at the end in the buffer and having the disposal priority 1 is disposed first. If all the packets stored in the transferring queue buffer have the disposal priority value 0, the transferred packet is disposed. Consequently, packets having the disposal priority value 1 respectively are always disposed earlier than those having the disposal priority 0.

Still another concrete example will be described below. In this example, each packet having the disposal priority value 0 is stored in a specific position in the transferring queue buffer regardless of the disposal priority of each packet stored in the transferring queue buffer. Each packet having the disposal priority value 1 is stored in a buffer just under those of all the packets already stored in the transferring queue buffer just like in the above example. At this time, if a packet having the disposal priority value 1 comes in the transferring queue buffer while the transferring queue buffer is full, the packet is disposed as is. However, if a packet having the disposal priority value 0 comes in the buffer, the packet is never disposed. This is based on a concept that for such information as that of a control packet, the newer the information is, the more important the packet is and newer control packets should be transmitted with priority over older control packets. Thus each packet having the disposal priority value 0 is received earlier in the transferring queue buffer and packets remaining without being transmitted to any routing and transferring unit are disposed sequentially.

Thus the disposal priority of each packet is judged before it is transferred. According to this method, therefore, each line interface unit judges the disposal priority of each packet, thereby such packets as control ones that might cause troubles in the network node when they are disposed can be transferred to each routing and transferring unit effectively. And accordingly, communications that do not permit packet loss are realized.

Third Embodiment

Next, the third embodiment of the present invention will be described.

Just like the second embodiment, in this third embodiment, the network node includes the routing and transferring unit employed in the first embodiment, a management processor, as well as a network port and an outbound packet transfer unit that are both included in each line interface unit. The network node also includes an inbound packet judging unit and a transferring queue buffer that are included in the line interface unit shown below. The inbound packet judging unit in this configuration has a judging function of the destination routing and transferring unit, which makes judgment according to information of an input port, L2 and L3 transmission and receiving addresses set in the header information in each inbound packet, as well as an input/output port number just like in the first embodiment.

Figure 14:
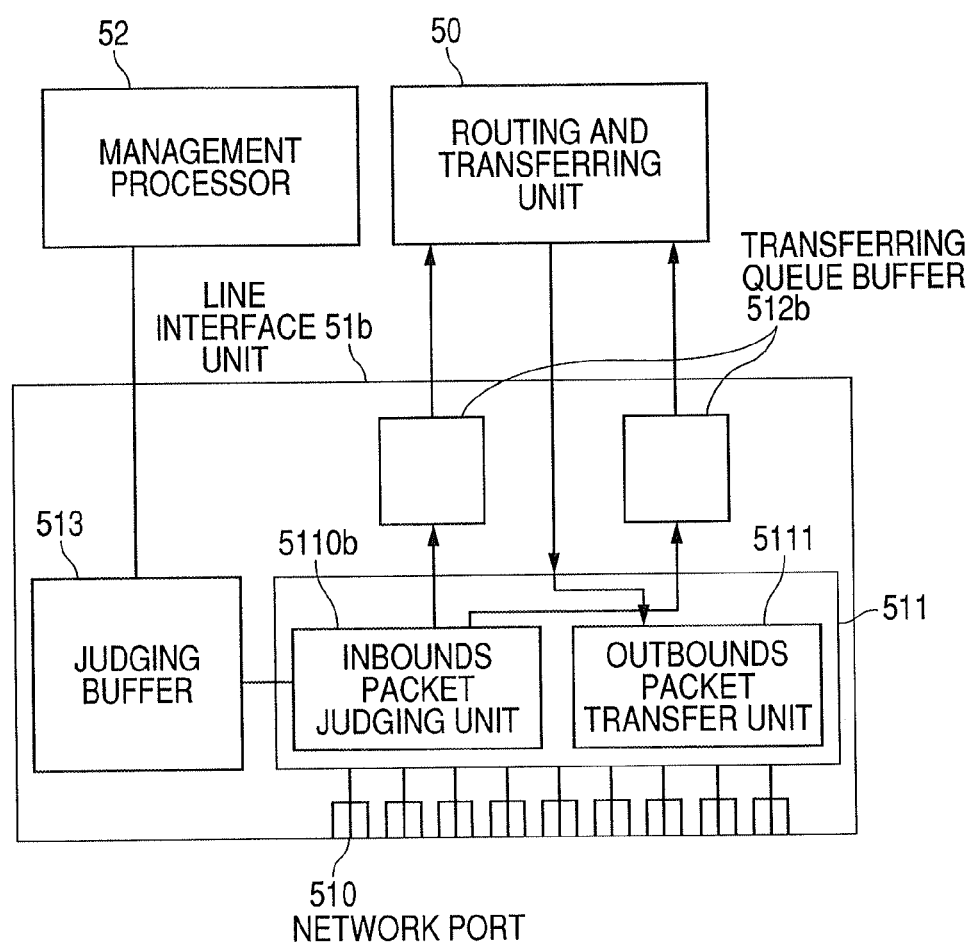
FIG. 14 is a schematic block diagram of a line interface unit having a function for adding transport priority.

FIG. 14 shows a schematic block diagram of a line interface unit. Receiving a packet from a network port, the line interface unit judges the disposal priority of the packet with use of an inbound packet judging unit. The judgment is done on the basis of a preset policy. Generally, packets are classified according to the QoS information, address of each packet, etc. into important packets and control packets to be transmitted with priority, and other less important packets that can be disposed if necessary. According to such a judgment result, the inbound packet judging unit judges the disposal priority parameter for each packet. Plural values may be set for the disposal priority. However, depending on the network node, an upper limit value is set for the priority. In this third embodiment, the disposal priority parameter is represented by two bits (0 to 3). The disposal priority in this embodiment is handled as follows; the less the number is, the higher the transferring priority becomes. Each packet judged for the disposal priority is transmitted to the transferring queue buffer together with the disposal priority.

Figure 15:
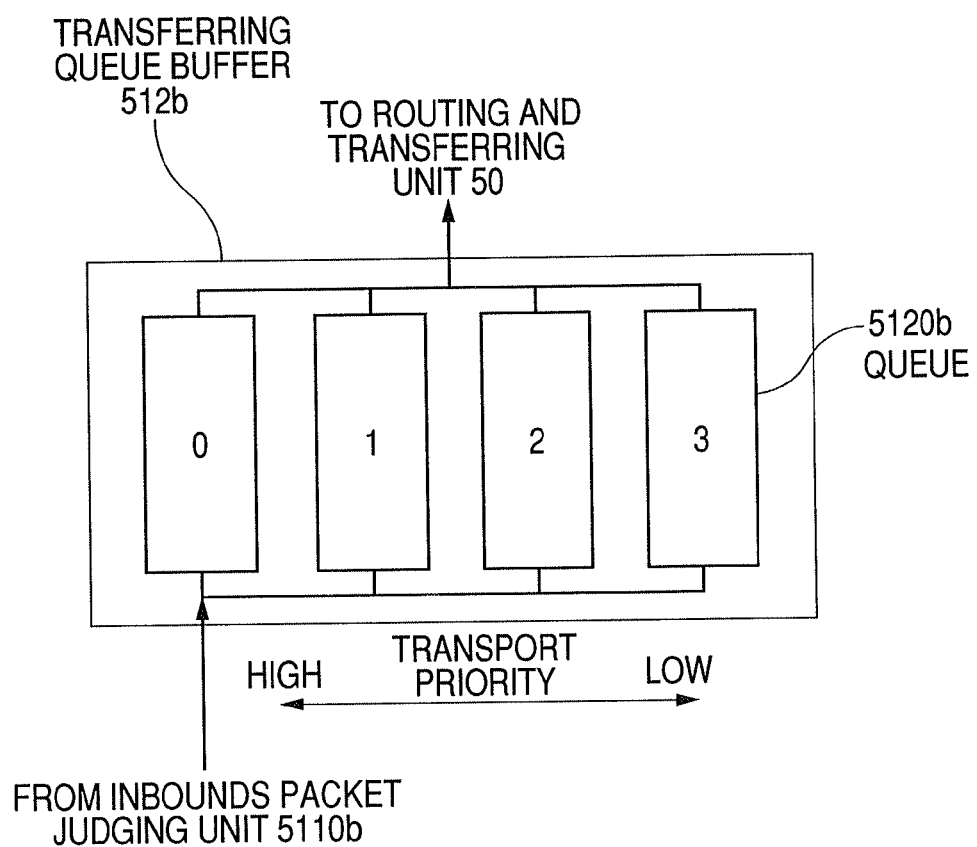
FIG. 15 is a schematic diagram of a transferring queue buffer corresponding to transport priority.

FIG. 15 shows a configuration of a transferring queue buffer. In this embodiment, plural transferring queue buffers are provided and transport priority judged in the routing and transferring unit is set for each of those buffers. And each packet is given a two-bit transport priority value within 0 to 3 and each transferring queue buffer has four transport priority values in the same way.

One of the methods for transferring packets from a transferring queue buffer to a routing and transferring unit is to start transferring of packets at a transferring queue buffer having higher transport priority and continue the transferring with priority until all the packets stored in the buffer are output. When no packet is left in the transferring queue buffer, the priority is shifted to the transferring queue buffer having the next higher priority to transfer the packets therefrom. Consequently, packets with higher transport priority are transferred sequentially with priority to the routing and transferring units.

Another method for transferring packets from a transferring queue buffer to a routing and transferring unit is to set a weight to the frequency of transfer from each transferring queue buffer according to the transport priority. In other words, for example, if packets are to be transferred to a routing and transferring unit ten times, concretely packets come to be transferred from the 0th transferring queue buffer 4 times, from the 1st transferring queue buffer 3 times, from the second transferring queue buffer twice, and from the third transferring queue buffer just once.

Next, a description will be made for an example for storing packets received from an inbound packet judging unit in a transferring queue buffer. Packets are classified and stored in transferring queue buffers according to their transport priority values. In this example, each packet is transferred to a transferring queue buffer having the same number as its transport priority value and stored at the end of the packets stored in the queue buffer. If the queue buffer is already full, the transferred packet is disposed.

In still another example, each transferred packet is stored at the end of the packets stored in the transferring queue buffer having the same number as its transport priority value. If the queue buffer is already full, the packet is stored at the top in the queue buffer having the next larger number of that of the queue buffer in which the packet is expected to be stored first. As a result, the numbers of the packets already stored in the queue buffer are shifted up by one respectively. If a received packet has the top transport priority and the transferring queue buffer having the top transport priority number is already full, the packet is disposed. If the queue buffer having the same number as the transport priority value of the received packet and the queue buffer having the next sequential number is also full, the packet is stored at the top of the queue buffer having the sequential number after next, thereby the numbers of the packets already stored there are shifted down by one respectively. At that time, the packet stored at the end in the queue buffer comes to be stored at the top of the queue buffer having the second larger number from the current one if it exists. If not exist, the packet is disposed. In the same way, if other queue buffers are all full, the packet stored at the end in the subject queue buffer is stored in a queue buffer having the third larger number and only the packet stored at the end in the queue buffer having the largest number is disposed.

Each of the methods described above can thus realize transferring of each packet from a line interface unit to a routing and transferring unit according to its judged transport priority value.

According to each of the methods described above, the present invention can obtain effects to enable each of control packets with high transport priority and required to be transferred quickly and packets required to be transferred with less delay to be transferred to a target routing and transferring unit respectively with priority.

Fourth Embodiment

Next, the fourth embodiment of the present invention will be described.

Just like the second and third embodiments, in this fourth embodiment, the network node includes the routing and transferring unit employed in the first embodiment, a management processor, as well as a network port and an outbound packet transfer unit that are both included in each line interface unit. The network node also includes an inbound packet judging unit and a transferring queue buffer that are both included in a line interface unit shown below. The details of a line interface unit in this fourth embodiment will be shown in FIG. 14. The inbound packet judging unit in this configuration uses a judging function of the destination routing and transferring unit and makes judgment according to the information of an input port, as well as L2 and L3 transmission and receiving addresses and an input/output port number set in the header information in each inbound packet just like in the first embodiment.

Figure 16:
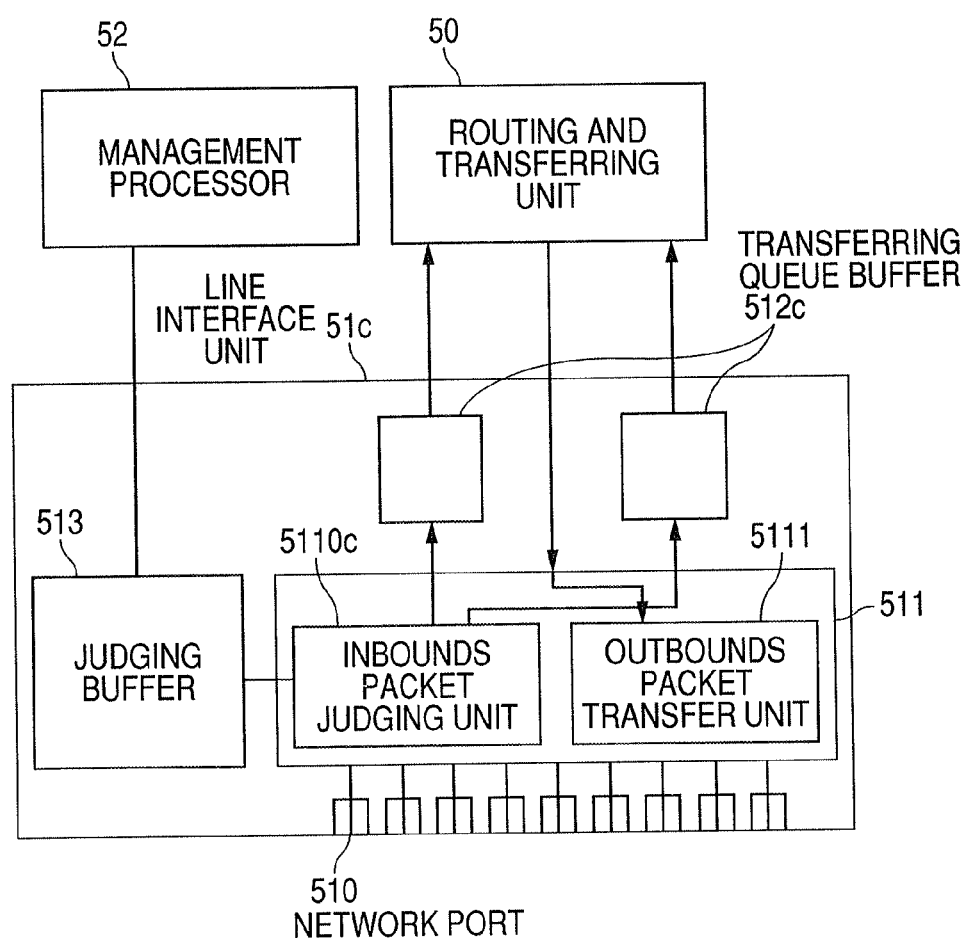
FIG. 16 is a schematic block diagram of a line interface unit having a function for adding both disposal priority and transport priority.

FIG. 16 shows a schematic block diagram of a line interface unit. Receiving a packet from a network port, the line interface unit judges the disposal priority and the transport priority of the packet with use of the inbound packet judging unit. The judgment is done on the basis of a preset policy. Packets are classified according to the QoS information and address of each packet into important packets to be transmitted with priority and less important packets that can be delayed or disposed if necessary. According to such a judgment result, the inbound packet judging unit judges the disposal priority and transport priority parameters for each packet. In this embodiment, each packet is given a one-bit value (0 or 1) for the disposal priority and a two-bit value (0 to 3) for the transport priority. If 0 is set for the disposal priority, the packet cannot be disposed. If 1 is set, however, the packet can be disposed. As for the transport priority, the lower the number is, the higher the priority becomes for the transfer. Each packet judged such way is transmitted to a transferring queue buffer together with the disposal priority and transport priority.

Figure 17:
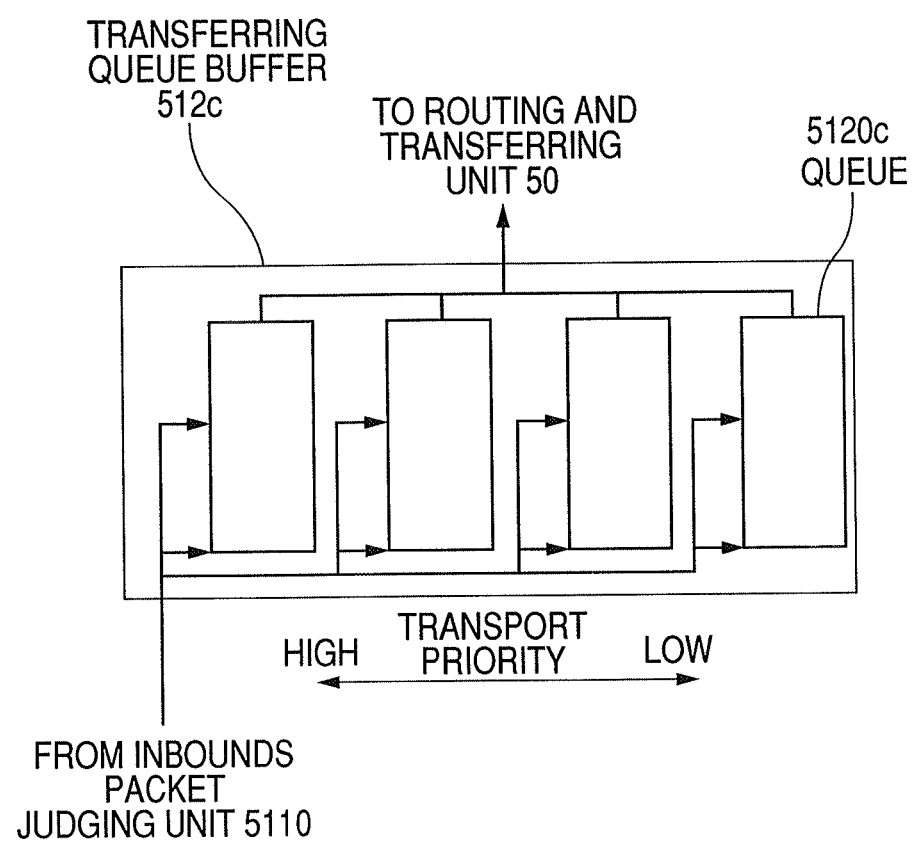
FIG. 17 is a schematic diagram of a transferring queue buffer corresponding to both disposal priority and transport priority.

FIG. 17 shows a configuration of a transferring queue buffer. In this embodiment, plural transferring queue buffers are provided and they are given different transport priority values respectively. In this embodiment, each transport priority is represented by two bits (four numbers) and four transferring queue buffers are provided. The number of transferring queue buffers is not necessarily the same as the number of transport priority values. Each of the plurality of transferring queue buffers is given a transport priority value corresponding to a routing and transferring unit.

In this embodiment, packets are transferred from a transfer queue buffer to a routing and transferring unit as follows; transferring of packets starts at a transferring queue buffer having a higher transport priority value and continues the transferring with priority until all the packets stored in the buffer are output. When no packet is left in the transferring queue buffer, the priority is shifted to the transferring queue buffer having the next higher priority to continue the transfer the packets therefrom. Consequently, packets with higher transport priority are transferred sequentially with priority to a target routing and transferring unit respectively.

According to another method for transferring packets from a transferring queue buffer to a routing and transferring unit, a weight is set to the frequency of each transfer while transferring packets from a transferring queue buffer having the highest transport priority to the one having the lowest priority until all packets are output from all the transferring queue buffers.

A disposal priority value determines the position of a packet to be stored in a transferring queue buffer. Concretely, there are two methods for storing packets in a transferring queue buffer; one method is to search the disposal priority of each packet in a transferring queue buffer and packets are stored so that those with lower disposal priority are stored in upper positions respectively and the other method is to store a packet in a specific position if packets are already stored over a certain number in the subject transferring queue buffer and the subject packet disposal priority is low while storing packets having lower disposal priority respectively in a buffer just under the current one. In any of the methods, when all the subject transferring queue buffers are full, the packets in the last queue buffer come to be disposed.

According to this embodiment, the transport priority is used to select the queue buffer in which the subject packet is to be stored and the disposal priority is used to select the position of the packet in the queue buffer. Such way, in this embodiment, both disposal priority and transport priority are judged and the method for storing packets in transferring queue buffers is determined according to the two priority values. Thus transferring and disposition can be managed more in detail than when they are managed only with either of disposal priority and transport priority.

Fifth Embodiment

Next, the fifth embodiment of the present invention will be described.

In this embodiment, the configuration in the embodiment is employed basically. However, the line interface unit judges both disposal priority and transport priority for each received packet as described in the fourth embodiment. The details of the line interface unit will be described below.

FIG. 18 shows a configuration of the line interface unit. The inbound packet judging unit judges whether or not each inbound packet should be processed by a specific routing and transferring unit to disperse the load of the routing and transferring unit. The inbound packet judging unit also has a function for adding both disposal priority and transport priority parameters to the subject packet. How the function is used is the same as that described in the first and fourth embodiments. Judgments for whether to use those two functions may be done at the same time. Consequently, the searching in the inbound packet judging unit can be effective just like in the first and fourth embodiments.

The inbound packet judging unit makes pattern matching for each inbound packet to judge whether or not the packet should be processed by a specific routing and transferring unit. Based on a preset policy, both disposal priority and transport priority are set for a packet that is judged to be processed by a specific routing and transferring unit. Each packet judged not to be processed by any specific routing and transferring unit is subjected to judgment of both disposal priority and transport priority according to the header information and the destination routing and transferring unit is determined according to the information of the packet inputted port, L2 and L3 transmission and receiving addresses, and input/output port.

Because judgments described in the first and fourth embodiments are made such way, this configuration can improve the efficiency of the judgments more than those judgments are done one by one.

Generally, the present invention can apply to any packet transferring method of a network node through a network.

What is claimed is:
1. A packet transferring node, including:
a plurality of line interface units to be coupled to a network via a network port; and
a plurality of routing and transferring units connected to said plurality of line interface units,
wherein, upon receiving a packet from said network via said network port, said line interface units perform a first judgment of whether said received packet is a specific packet,
if said received packet is judged to be a specific packet, said line interface units transfer said packet to a specific routing and transferring unit that executes a first process related to packet routing and a second process that is distinct from said first process, and
if said received packet is not judged to be a specific packet, said line interface units perform a second judgment determining whether said received packet belongs to a predetermined flow based on the said received packet to select one routing and transferring unit to which said received packet is to be transferred among said plurality of routing and transferring units including said specific routing and transferring unit.

2. The packet transferring node according to claim 1, wherein at least one of said plurality of line interface units sets disposal priority for said received packet according to a result of identification of said received packet, and wherein said line interface units, upon detecting congestion during transfer of said received packet to said routing and transferring unit selected for transmitting said received packet to, judge whether to dispose said received packet according to said disposal priority.

3. The packet transferring node according to claim 1, wherein at least one of said plurality of line interface units sets transport priority for said received packet according to a result of identification of said received packet, and wherein, upon detecting congestion during transfer of said received packet to said routing and transferring unit to which said received packet is to be transmitted, said line interface units transfer said received packet with priority according to said transport priority.

4. The packet transferring node according to claim 1, wherein said first judgment is a determination of whether said received packet is a specific control packet.

5. The packet transferring node according to claim 4, wherein said specific control packet is a control packet conforming to a ring network protocol.

6. The packet transferring node according to claim 5, wherein said control packet conforming to said ring network protocol is a connection monitoring packet.

7. The packet transferring node according to claim 1, wherein said specific routing and transferring unit is assigned to execute both said second process relating to said specific packet and said first process relating to packet routing for said received packet which is communicated between a source node and a destination node.

8. The packet transferring node according to claim 1, wherein said line interface units perform said second judgment based on a value obtained by applying a function to information included in a header of said received packet, and select a routing and transferring unit corresponding to said value.

9. The packet transferring node according to claim 1, wherein said line interface units perform said second judgment based on a header of said received packet.

10. The packet transferring node according to claim 9, wherein said line interface units, when said second judgment is performed, calculate a value using said header of said received packet and function, and select a routing and transferring unit corresponding to said calculated value.

* * * * *